United States Patent [19]

Shvach et al.

[11] Patent Number: 6,005,757
[45] Date of Patent: Dec. 21, 1999

[54] ELECTRICAL SWITCHING DEVICE OR TRIP UNIT ACQUIRING PREDETERMINED SETTINGS FROM ANOTHER ELECTRICAL SWITCHING DEVICE OR TRIP UNIT

[75] Inventors: Randal P. Shvach, Conway; Joseph J. Matsko, Beaver, both of Pa.

[73] Assignee: Eaton Corporation, Cleveland, Ohio

[21] Appl. No.: 09/075,799

[22] Filed: May 11, 1998

[51] Int. Cl.⁶ ......................... H02H 3/00
[52] U.S. Cl. ................ 361/64; 361/66; 361/68
[58] Field of Search .............. 361/62–70, 93–97, 361/99, 102, 78–87

[56] References Cited

U.S. PATENT DOCUMENTS

| | | | |
|---|---|---|---|
| 4,428,022 | 1/1984 | Engel et al. | 361/96 |
| 4,606,313 | 8/1986 | Izumi et al. | 123/386 |
| 4,887,057 | 12/1989 | Gula et al. | 335/190 |
| 5,200,724 | 4/1993 | Gula et al. | 335/166 |
| 5,270,898 | 12/1993 | Elms et al. | 361/96 |
| 5,341,191 | 8/1994 | Crookston et al. | 335/16 |
| 5,420,799 | 5/1995 | Peterson et al. | 364/483 |
| 5,525,985 | 6/1996 | Schlotterer et al. | 341/136 |
| 5,600,527 | 2/1997 | Engel et al. | 361/93 |
| 5,793,750 | 8/1998 | Schweitzer, III et al. | 370/242 |

*Primary Examiner*—Michael J. Sherry
*Attorney, Agent, or Firm*—Martin J. Moran

[57] ABSTRACT

A first trip unit for interconnection with a second trip unit includes current transformers and potential transformers for sensing current, voltage and frequency conditions of a circuit breaker's separable contacts. A microprocessor-based trip mechanism provides a trip signal, which is employed by the circuit breaker's operating mechanism to open the separable contacts as a function of the sensed electrical conditions and related predetermined operating values. The microcomputer's transceiver communicates with the second trip unit over a passive two-wire communication cable to acquire the predetermined settings of the second trip unit. The microcomputer includes a firmware routine which employs the acquired predetermined settings as its predetermined values.

2 Claims, 9 Drawing Sheets

6,005,757

ELECTRICAL SWITCHING DEVICE OR TRIP UNIT ACQUIRING PREDETERMINED SETTINGS FROM ANOTHER ELECTRICAL SWITCHING DEVICE OR TRIP UNIT

FIELD OF THE INVENTION

This invention relates to electrical switching devices and, more particularly, to circuit breakers employing predetermined settings such as, for example, predetermined settings in connection with a trip function or user-interface. The invention also relates to trip units employing predetermined settings.

BACKGROUND INFORMATION

Electrical switching devices include, for example, circuit switching devices and circuit interrupters such as circuit breakers, contactors, motor starters, motor controllers and other load controllers. Circuit breakers are generally old and well known in the art. Examples of circuit breakers are disclosed in U.S. Pat. Nos. 4,606,313; 4,887,057; 5,200,724; and 5,341,191.

Circuit breakers are widely used in industrial, commercial and residential applications for protecting electrical circuitry, conductors and apparatus from damage due to an overcurrent condition, such as an overload condition or a relatively high level short circuit condition. Initially used as a direct replacement for fuses, circuit breakers have been gradually called upon to provide more sophisticated types of protection other than merely interrupting the circuit when the current flow exceeds a certain level. More elaborate time-current trip characteristics have been developed such that a circuit breaker can rapidly open upon very high current with the time delay being roughly inversely proportional to the degree of overload. Circuit breakers are also available which interrupt upon the detection of ground fault currents. As the complexity of electrical distribution circuits has increased, the control portions of the circuit breaker have been augmented to provide appropriate protection and monitoring functions.

During the late 1960's, solid state electronic trip units were developed for use in high power, low voltage circuit breakers. These electronic trip units performed functions such as instantaneous and delayed tripping which were traditionally achieved by magnetic and thermal means. The improved accuracy and flexibility of the solid state electronic trip units resulted in their wide spread acceptance.

The earliest electronic trip unit circuit designs utilized discrete components such as transistors, resistors and capacitors. More recently, designs, such as disclosed in U.S. Pat. No. 4,428,022, have included microprocessors which provide improved performance and flexibility. See also, for example, U.S. Pat. No. 5,525,985.

These digital systems sample the current waveforms periodically to generate a digital representation of the current. The microprocessor uses the samples to execute algorithms which implement the current protection curve which is typically based upon a constant value of $I^2t$ where "I" is the value of current and "t" is the time-to-trip. Typically, in air circuit breakers and vacuum circuit interrupters, this protection curve provides an instantaneous trip, a long delay trip and, if appropriate, a short delay trip function. In some circuit interrupters, the microprocessor also performs voltage protection as well as calculations for metering such as determining the RMS value of the highest phase current.

It is also common today to have a plurality of such circuit interrupters monitored and controlled by a central network control station such as is described in U.S. Pat. No. 5,420,799. The central monitoring and control network typically communicates digitally with multiple circuit interrupters over a common network. In turn, the circuit interrupters usually have mechanical status indicating accessory devices mounted within the casings which are used by external and remote monitoring and control equipment. Examples include auxiliary contacts which follow the open/close status of the circuit breaker and bell alarm contacts which are closed if the breaker is in the tripped condition.

The increase in functional versatility that the electronic trip units of circuit breakers have added by employing the capabilities of microprocessors has required the processing circuitry to monitor wide ranges in current and related parameters which can vary from the open state, to a normal operating range in which most of the metering calculations are performed, to short circuit states which exceed the normal operating range by a factor of ten times or much greater. In turn, the process required to configure such electronic trip units is very complex and typically requires either the substantial involvement of a user through a programming panel or separate programming device or, alternatively, the use of a host computer or the like to automatically perform such programming.

Accordingly, there is room for improvement in the configuration of trip units and electrical switching devices employing such units.

SUMMARY OF THE INVENTION

In accordance with the invention a first or apprentice trip unit is interconnected with a second or master trip unit to acquire at least one predetermined setting from the second trip unit. In this manner, there is no requirement to employ some other intelligence, such as that of a user or host computer, to program the first trip unit. Instead, the first trip unit is configured without the substantial involvement of the user and without requiring the presence or expense of a host computer.

As one aspect of the invention, an improved first trip unit for interconnection with a second trip unit includes means for sensing at least one electrical condition operatively associated with a switching device's separable contact mechanism. A trip means provides a trip signal, which is employed by the switching device's operating mechanism to open the separable contact mechanism, as a function of the at least one sensed electrical condition and at least one predetermined value. A means communicates with the second trip unit by employing a communication channel to acquire at least one predetermined setting of the second trip unit. The trip means includes means for employing at least one of the acquired at least one predetermined setting as the at least one predetermined value.

Preferably, the means for employing at least one of the acquired at least one predetermined setting includes means cooperating with the means for communicating for initiating transfer of the at least one predetermined setting from the second trip unit to the means for communicating with the second trip unit. A means receives the transferred at least one predetermined setting from the means for communicating with the second trip unit. A means stores the received transferred at least one predetermined setting, and a means employs at least one of the stored received transferred at least one predetermined setting as the at least one predetermined value.

In a preferred embodiment, the acquired at least one predetermined setting includes a plurality of display configuration settings and a plurality of trip unit operation settings. The trip means further includes display means for displaying at least some of the trip unit operation settings, and means employing the display configuration settings for selectively displaying the trip unit operation settings.

As another aspect of the invention, a first circuit breaker includes a communication channel for interconnection with a second circuit breaker, and separable contacts having at least one electrical condition. An operating means employs a trip signal for opening the separable contacts. A means senses the at least one electrical condition of the separable contacts. A trip unit includes trip means for providing the trip signal to the operating means as a function of the at least one sensed electrical condition and at least one predetermined value, means for communicating with a second circuit breaker by employing the communication channel to acquire at least one predetermined setting of the second circuit breaker, and means for employing at least one of the acquired at least one predetermined setting as the at least one predetermined value.

Preferably, the at least one electrical condition includes at least one of a current condition, a voltage condition and a frequency condition of the separable contact mechanism.

As a further aspect of the invention, a pair of substantially similar electrical switching devices comprises a first electrical switching device having at least one predetermined setting, a second electrical switching device, and a communication channel interconnecting the first and second electrical switching devices. Each of the first and second electrical switching devices comprises separable contacts, operating means employing a trip signal to open the separable contacts, means for sensing at least one electrical condition operatively associated with the separable contacts, and a trip unit. The trip unit comprises memory means for storing at least one predetermined value, means for providing the trip signal to the operating means as a function of the at least one sensed electrical condition and the stored at least one predetermined value, and means for communicating with another electrical switching device by employing the communication channel. The trip unit of the second electrical switching device further comprises means cooperating with the means for communicating with another electrical switching device for transferring the at least one predetermined setting from the first electrical switching device, means for receiving the transferred at least one predetermined setting from the means for communicating with another electrical switching device, and means for storing the received transferred at least one predetermined setting in the memory means as the at least one predetermined value.

In a preferred embodiment, the first electrical switching device includes means for providing power to the second electrical switching device, in order to transfer the at least one predetermined setting from the first electrical switching device to the second electrical switching device. In this manner, the second electrical switching device need not be connected to the line voltage of an electrical distribution circuit.

As a still further aspect of the invention, a first trip unit comprises means for sensing an electrical condition operatively associated with a switching device's separable contact mechanism, trip means for outputting a trip signal for the switching device's operating mechanism as a function of the sensed electrical condition and another operating value, in order to open the separable contact mechanism, and means for communicating with a second trip unit by employing the second trip unit's communication channel to acquire a predetermined operating value of the second trip unit for use by the trip means as the another operating value.

Preferably, the communication channel is a serial data channel. The means for communicating with the second trip unit includes means for transmitting a first serial signal to the serial data channel to request the predetermined operating value, and means for receiving a second serial signal from the serial data channel to acquire the predetermined operating value.

In a preferred embodiment, the communication channel is a passive communication cable, and the means for communicating is adapted to be used with the passive communication cable.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENT

As employed herein, the term "setting" shall expressly include, but not be limited to, value, number, digital or boolean state, character(s) such as alphabetic character(s) or alpha-numeric character(s), or other representations of operating features or user-interface configurations.

As employed herein, the term "predetermined setting" shall expressly include, but not be limited to, those settings which are predetermined such as, for example, through programming, configuration or adjustment by a user or programnming device.

Figure 1:
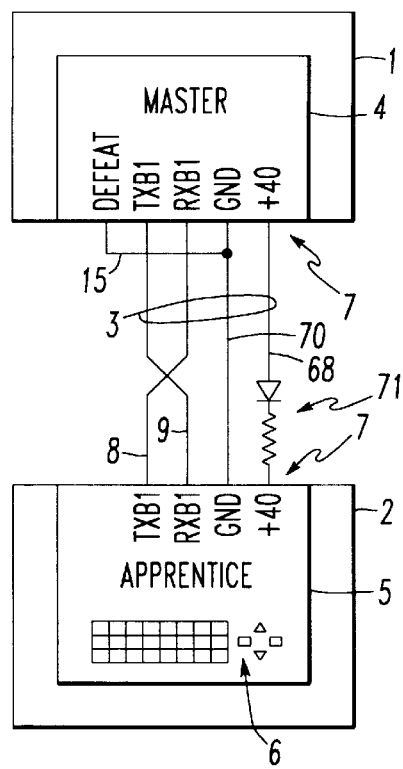
FIG. 1 is a block diagram of a master circuit breaker, an apprentice circuit breaker, and a communication cable therebetween in accordance with the invention.

FIG. 1 is a block diagram of circuit breakers 1,2 and a communication cable 3 therebetween in accordance with the invention. The circuit breakers 1,2 include respective trip units 4,5 (discussed below in connection with FIG. 2). The "master" (or teacher) trip unit 4 contains predetermined settings. In accordance with the invention, those settings are transferred to the "apprentice" (or student) trip unit 5 which receives (and learns) those settings. The transfer function between the trip units 4,5 employs a communication channel between the master and apprentice units in the form of an exemplary communication cable 3.

As shown in FIG. 1, the apprentice unit 5 includes a display interface 6 which the user employs to access the transfer function. The communication cable 3 connects to the test port 7 of the respective circuit breakers 1,2 and includes two signal conductors 8,9 for cross-connecting transmit serial signals TXB1 and receive serial signals RXB1 between the master and apprentice units. Although the exemplary passive communication cable 3 is preferred in terms of reduced cost, simplicity of design, ease of use, and avoidance of additional and/or active components, it will be appreciated that a wide range of communication channels may be employed (e.g., without limitation, coaxial, fiber optic, telephone, point-to-point data link, communication network, serial data channel, parallel data channel) including passive and/or active components.

Figure 2:
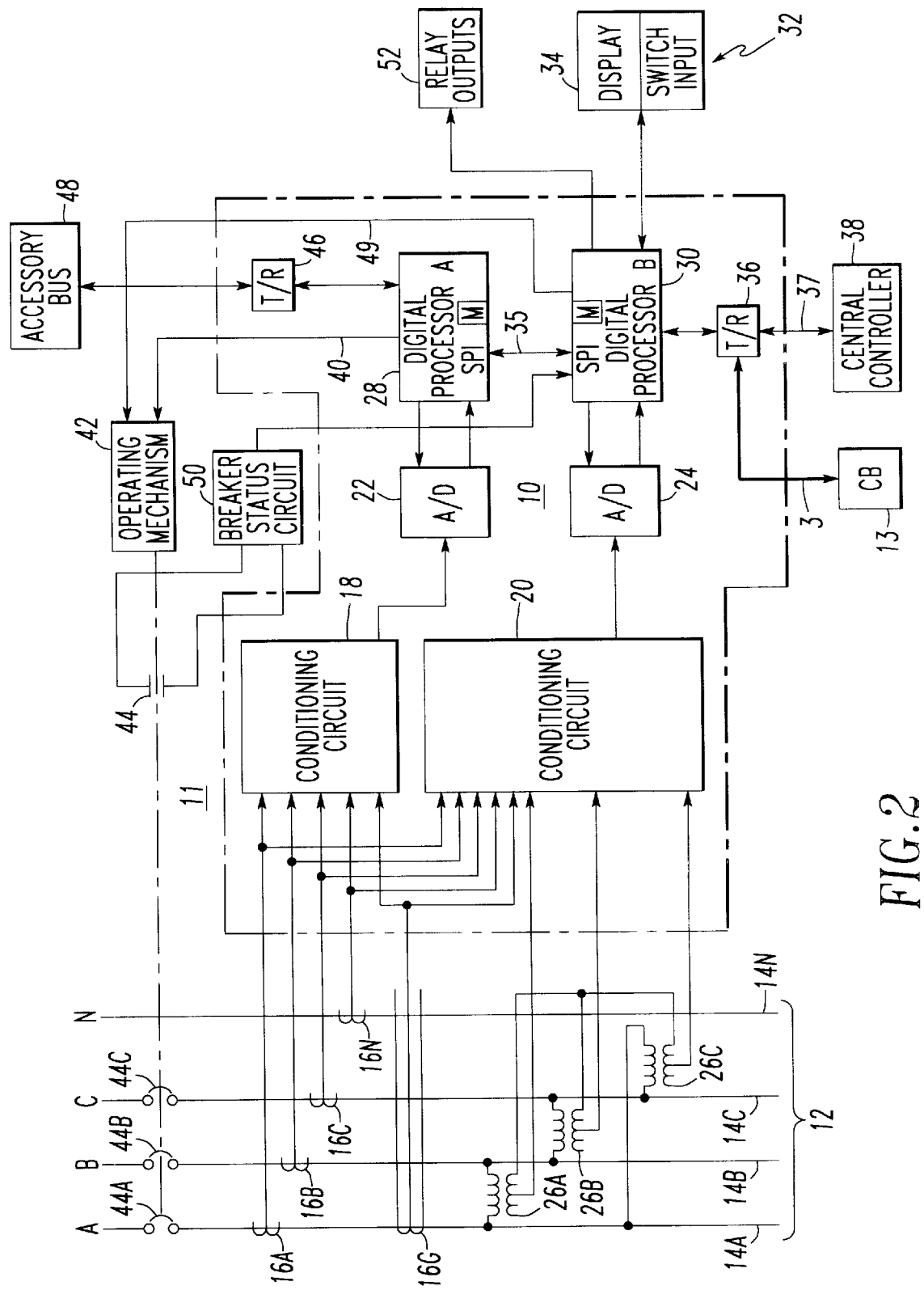
FIG. 2 is a schematic diagram, primarily in block form, illustrating one of the circuit breakers of FIG. 1.

FIG. 2 illustrates an exemplary electronic trip unit 10 and circuit breaker 11 in accordance with the invention in combination with ancillary components used for protection and capture of waveforms in an exemplary AC electrical power distribution system 12, which represents the load. The trip unit 10 corresponds to the master trip unit 4 of FIG. 1 and is interconnected with the trip unit (not shown) of another circuit breaker (CB) 13 corresponding to the apprentice circuit breaker 2 of FIG. 1.

The exemplary power distribution system 12 has three phase conductors 14A,14B,14C, and a neutral conductor 14N. Current transformers 16A,16B,16C, and 16N, respectively, sense current flowing in each of these conductors, although the invention is applicable to a wide variety of electrical switching devices which employ one or more predetermined settings for one or more phases, with or without neutral. Current transformer 16G is a zero sequence transformer which indirectly measures ground current by directly measuring the sum of the phase and neutral currents.

The sensed current signals are suitably conditioned by conditioning circuits 18 and 20 which prepare those signals for processing by analog-to-digital (A/D) converters 22 and 24, respectively. Phase-to-phase voltages are also sensed from the three phase conductors 14A,14B,14C by potential transformers 26A,26B,26C, respectively, and the sensed voltage signals are input to conditioning circuit 20 for subsequent conversion by A/D converter 24. Preferably, the conditioning circuits 18 and 20 scale the sensed current and voltage signals to a suitable range for conversion by the A/D converters 22 and 24 for input to microprocessors (A) 28 and (B) 30, respectively.

In the preferred embodiment, the conditioning circuits 18,20, the A/D converters 22,24, and the microprocessors 28,30, are integrated in two microcomputers, such as a SURE CHIP PLUS™, as disclosed in U.S. Pat. No. 5,270,898, which is incorporated by reference herein. Although two microprocessors or microcomputers are shown, it will be appreciated that the invention is applicable to trip units having one, three or more processors, or other logic, to provide the trip function.

The exemplary A/D converter 24 samples analog voltages and currents at sampling instances determined by interrupts generated by the microprocessor 30 in a manner more particularly described in U.S. Pat. No. 5,600,527, and the patents referenced therein. The exemplary microprocessor 30 utilizes the data generated by the digital samples to provide voltage based protection functions such as, for example, under/over voltage protection for the electrical system 12 and, also, employs the samples for waveform capture and harmonic analysis for metering and display purposes.

Figure 6:
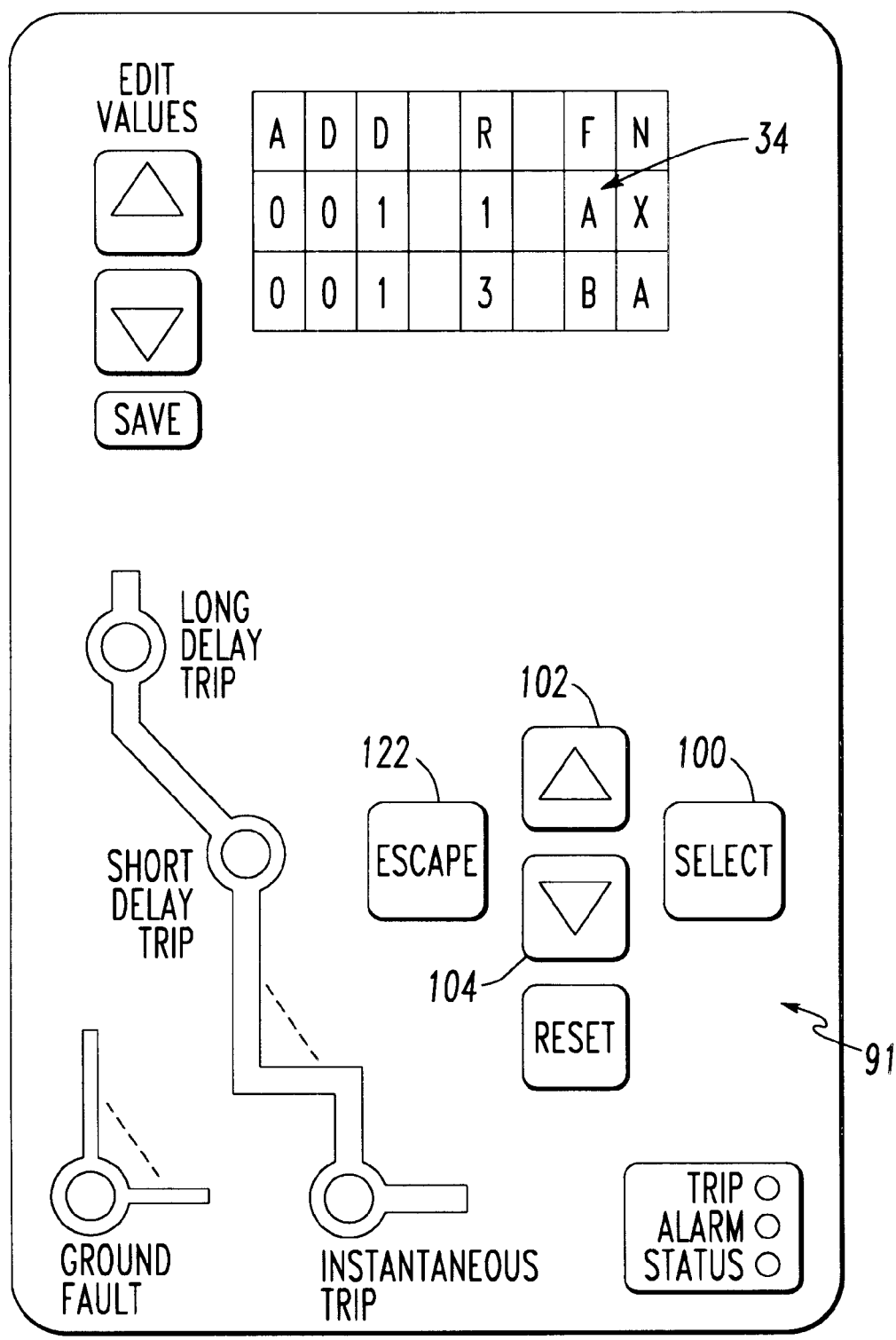
FIG. 6 is a simplified perspective view of a display and switch input panel of one of the circuit breakers of FIG. 1.

The microprocessor 30 communicates with an exemplary display and switch input panel 32 more fully illustrated in FIG. 6. The panel 32 serves as an exemplary interface with a user, although a wide range of alternative user-interfaces are possible. In the exemplary embodiment, the user controls the operation of the circuit breaker 11 through the panel 32 and, also, monitors the AC electrical power system 12, including the harmonic content of the waveform and various measured values such as power factor. To this end, the panel 32 has a display 34 on which the harmonic content of the waveforms can be presented to the user. The panel 32 may also be used to input various settings (e.g., the circuit breaker protection setpoints).

The microprocessors 28,30 communicate with one another through a serial peripheral interface (SPI) link 35 which also allows, for example, communication between microprocessor 28 and panel 32. The SPI link 35 is described in U.S. Pat. No. 5,270,898. The other microprocessor 30 communicates with a remote processor using a communication link 36 such as the exemplary transmit and receive (T/R) circuit or transceiver. The transceiver 36 enables the circuit breaker 11 to provide information to and be controlled over a network interface 37 by a remote processor such as a central controller or host computer network station 38. A suitable central controller and network that may be employed for this purpose is described in U.S. Pat. No. 5,420,799. Central control networks of that type typically communicate over a common bus using a digital, asynchronous communication protocol.

In the exemplary embodiment, the various processing functions are split between the microprocessors 28,30. In this manner, monitoring, voltage based protection, and metering functions and algorithms that need to be processed over the normal operating range of the power circuit 12 are managed by the second microprocessor 30, while the overcurrent trip related functions are handled by the first microprocessor 28.

The first microprocessor 28 operates in an overcurrent protection mode to generate a trip signal 40 when any one of the current/time characteristics of a delayed trip protection function is exceeded. This trip signal 40 is passed to a switching device formed by an operating mechanism 42 and separable contacts 44A,44B,44C. The transformers 16A, 16B,16C,16N,16G and 26A,26B,26C sense current, voltage and frequency conditions of the conductors 14A,14B,14C and, thus, of the separable contacts 44A,44B,44C in those conductors. The operating mechanism 42 also employs the trip signal 40 to open the separable contacts 44A,44B,44C for an instantaneous overcurrent trip function.

The operating mechanism 42 is typically a mechanically latched electronically released mechanism. Although typically not provided in the United States, additional separable contacts may be included to interrupt current in the neutral conductor 14N. The microprocessor 28 communicates through a second transceiver (T/R) 46 to an accessory bus network 48 which is described below in connection with FIG. 3.

The second microprocessor 30 communicates with the operating mechanism 42 through a second trip signal 49 which is also employed to open the separable contacts 44A,44B,44C. In this manner, the conditioning circuit 20 need not scale the sensed currents to the coarse range that otherwise would have been required and, thus, the microprocessor 30 has more information available to it from the current signals to perform its given functions. The exemplary separate conditioning circuits 18 and 20 permit different ranging factors for their respective microprocessors 28 and 30, and enable those microprocessors to implement different sampling rates which is sometime beneficial as noted in U.S. Pat. No. 5,600,527. Accordingly, the exemplary trip unit 10 outputs a trip signal formed by signals 40,49 to the operating mechanism 42 as a function of various sensed electrical conditions and corresponding predetermined settings, such as operating values, in order to open the separable contacts 44A,44B,44C.

The overcurrent protection mode of the first microprocessor 28 generates the trip signal 40 in response to various current conditions including, for example, long delay trip, short delay trip, instantaneous trip, ground fault trip, neutral ampere trip, and amperes out of balance trip. The microprocessor 28 also generates alarms (e.g., by employing the accessory bus 48) in response to other current conditions including, for example, long delay pickup alarm, ground alarm, neutral ampere alarm, and high load alarm.

The voltage protection mode of the second microprocessor 30 generates the trip signal 49 in response to various voltage conditions (e.g., under voltage trip, over voltage trip, reverse phase sequence trip, phase loss trip), various frequency conditions (e.g., under frequency trip, over frequency trip), and various power conditions (e.g., reverse power trip). The microprocessor 30 also generates alarms (e.g., by employing the SPI link 35, microprocessor 28, and accessory bus 48) in response to other voltage and frequency conditions (e.g., under voltage alarm, over voltage alarm, under frequency alarm, over frequency alarm).

The microprocessor 30 monitors auxiliary contacts 44 on the circuit breaker 11 through a breaker status circuit 50 to indicate the breaker's open/closed condition. The microprocessor 30 also communicates with relay outputs 52 that provide local breaker status information (e.g., high load, ground fault) to a remote location.

In the exemplary embodiment, the microprocessor 28 performs overcurrent protection, trips the circuit breaker during overload and fault conditions, communicates with the microprocessor 30 through the SPI link 35, and serves as the master device for the accessory bus 48. The microprocessor 30 provides metering and voltage based protection, monitors circuit breaker status, controls output relays, interfaces with the user by way of the panel 32, performs voltage and/or frequency protection or tripping upon a request from the central controller 38, communicates with the microprocessor 28 through the SPI link 35, and remotely communicates with the central controller 38 which serves as a master device to the circuit breaker 11. Either microprocessor 28 or 30 can trip the circuit breaker 11 should the information shared over the SPI link 35 indicate that either or both microprocessors detect a problem.

Figure 3:
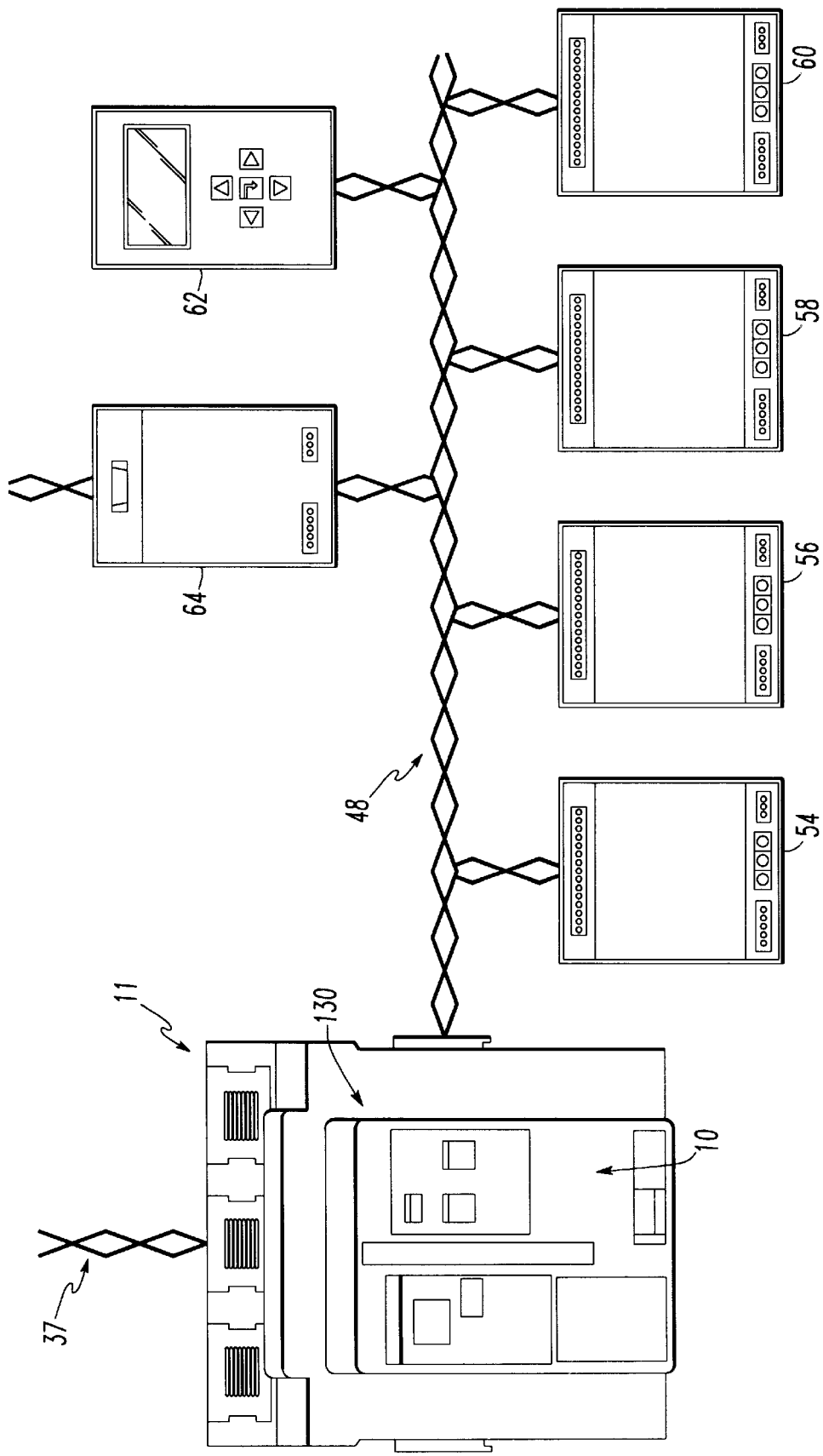
FIG. 3 is a schematic diagram showing an accessory bus network of one of the circuit breakers of FIG. 1.

As shown in FIG. 3, a two wire, asynchronous, serial communication accessory bus network 48 controls remote devices such as, for example, analog and digital input and output accessory units 54,56,58,60; remote display device 62 which is an accessory providing a remote display; and an interface 64 which is an accessory bus interface for devices, such as a personal computer or a communications MODEM. The interface 64 may, for example, input, monitor and store circuit breaker trip unit setpoints, or communicate with other networks.

In the exemplary embodiment, the trip unit 10 employs a plurality of predetermined settings. For example, the address of each of the devices 54,56,58,60, 62,64 can be set by its function, for example, as in Table I, below, where "DO" represents digital output devices; "DI" represents digital input devices; "AO" represents analog output devices; "AI" represents analog input devices; "DD" represents digital display devices; and "I" represents an interface to another system.

The panel 32 of FIG. 2 can be used to program the predetermined settings. Preferably, each of the devices employs switches to allow its address to be set. Also, the panel 32, as shown in FIG. 6, can be used to program the accessory bus network 48. The display 34 of the panel 32 has three rows with eight alpha-numeric characters per row. In this example, the first row is used for column labels such as device address (ADD), relay number (R) and relay function (FN). The digital output (DO) device 54 is identified in the second row (address $001_H$) and its first (1) relay (e.g., it may have 4 relays) is programmed to function as an auxiliary contact (AX). The third row illustrates that the same device 54 has its third (3) relay programmed to function as a bell alarm (BA). Thus, the display 34 shown in FIG. 6 can be used to set the exemplary settings including the desired address, I/O number, and I/O function.

TABLE I

| Type | Address | Hardware | Function |
|---|---|---|---|
| DO | 001H | 1 or more relay outputs | auxiliary contacts which follow the state of the circuit breaker |
| DO | 002H | 1 or more relay outputs | bell arm contacts which indicate a trip condition |
| DO | 003H | 1 or more relay outputs | high load alarm contacts |
| DO | 004H | 1 or more relay outputs | ground fault alarm contacts |
| DO | 005H | 1 latched relay | time-delayed generator start |
| DI | 007H | 2 push button inputs | remote open/close control input |
| AO | 008H | 4 to 20 mA output | RMS value of the highest phase current (e.g., scaled 4 mA = 0 A and 20 mA = rated current) |
| AI | 009H | 3 RTD inputs | circuit breaker terminal or switchgear bus temperature |
| DD | 00AH | remote digital display | a remote mechanism for reading circuit breaker settings, metered values, etc. |
| I | 00BH | RS232/RS485 | PC or MODEM interface to the trip unit |

Referring again to FIGS. 2 and 3, the microprocessor 28 communicates with accessory bus devices using control messages. The analog input device 60 can be used, for example, to measure bus bar temperature with the switchgear near the breaker terminal connection. Such a temperature measurement could be made by a resistance temperature detector (RTD). The voltage output of the RTD would be an input to the device 60. The trip unit 10 can then read this value, display it on the display 34, and trip the circuit breaker 11 if the temperature reading is too high. A high reading can occur if the separable contacts 44A,44B,44C are worn or damaged. A poor contact can have a high resistance which will make the breaker's terminal run too hot, even if the current is below the full load rated value.

The digital input device 56 can be used, for example, to provide a remote open/close control station. For safety, it is desirable to be able to close a circuit breaker without standing directly in front of the unit. Two normally opened switches feeding the device 56 can be used for this purpose. One normally opened switch would be labeled OPEN while the other would be labeled CLOSE. The trip unit 10 could read these two switches such that if one and only one switch is closed the circuit breaker 11 would perform the requested action. If both are opened or closed no action would be taken. Such a request would be confirmed by multiple reads to avoid false action.

The remote display device 62 could be used, for example, to display analog and digital information such as is normally displayed at the trip unit 10 on the panel 32.

The accessory bus interface device 64 has a number of uses. When connected to a personal computer (PC) (not shown) it can be used to program the trip unit 10. The PC would have the ability to establish the desired setpoints through a user-interface on its display and then, on command, download the settings from the PC to the device 64. The trip unit 10 saves those values in a non-volatile EEPROM memory (M) of microprocessors 28,30, such that the values are preserved during a power outage, and, also, uploads these values to the PC on its command. Those settings can also be changed using the panel 32, microprocessor 30, and SPI link 35, and are similarly saved within the trip unit 10. Additional settings for the trip unit 10 are similarly stored in the EEPROM memory (M) of the microprocessors 28,30.

Preferably, the apprentice circuit breaker (CB) 13 of FIG. 2 is at least substantially similar to the circuit breaker 11, and includes substantially the same trip unit (not shown) having substantially the same components as the microprocessors 28,30, SPI link 35, and transceivers 36,46. In a like manner, the settings for the apprentice circuit breaker 13, which are similar stored in EEPROM memory of its microprocessors 28,30, may be programmed by a PC through an accessory bus interface device such as 64 of FIG. 3, or by using a panel such as 32 of FIG. 2. In accordance with the present invention, the settings of the master circuit breaker 11 are transferred to the apprentice circuit breaker 13 over the communication channel 3 interconnecting the breakers 11,13.

Figure 4:
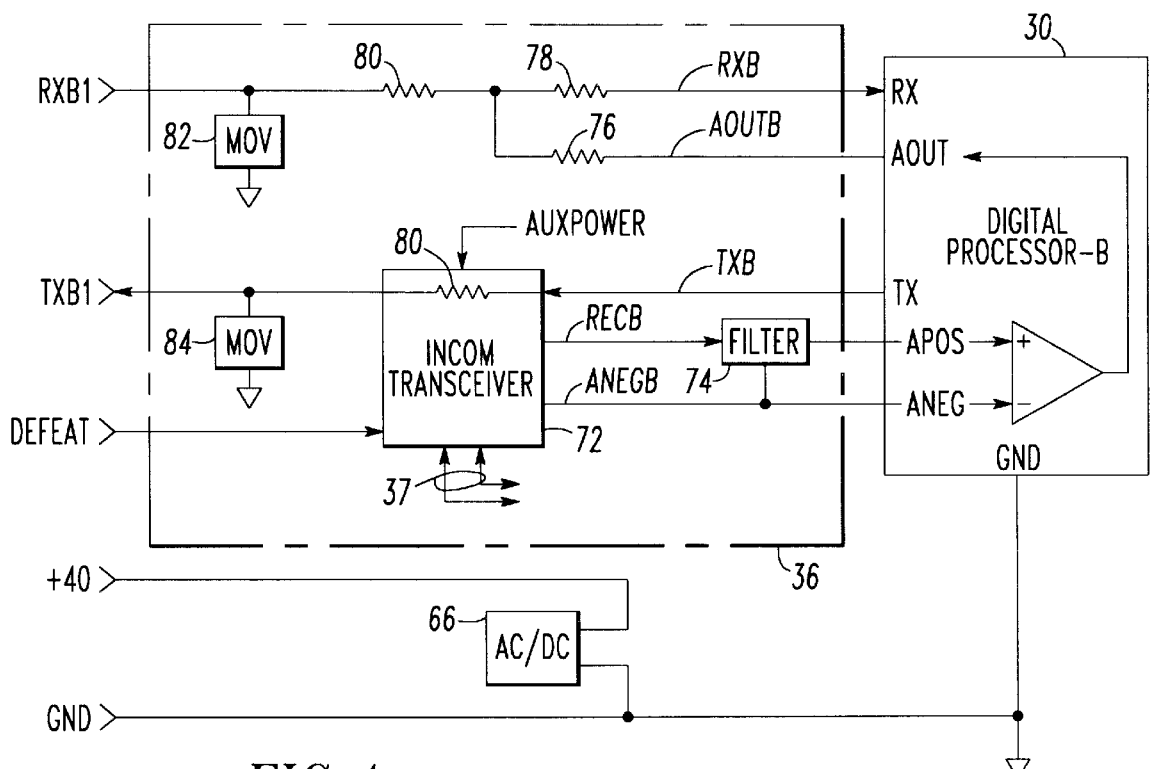
FIG. 4 is a schematic diagram, primarily in block form, showing the communication interface of one of the circuit breakers of FIG. 2.

Referring to FIG. 4, the communication interface transceiver (T/R) 36 of FIG. 2 is illustrated along with the microprocessor 30 and a suitable AC to DC power supply 66. Preferably, a communication interface transceiver, such as transceiver 36 which is adapted to be used with the communication cable 3, is provided in both of the circuit breakers 11,13 of FIG. 2.

Also referring to FIGS. 1 and 2, one end of the exemplary communication cable 3 is designated to be connected to the master circuit breaker, such as 1 and 11 (trip units 4 and 10, respectively), which contains the settings to be downloaded, and the other end of this cable is designated to be connected to the apprentice circuit breaker, such as 2 (trip unit 5) and 13, which is to receive the downloaded settings. In the exemplary embodiment, the master end of the cable 3 includes a jumper 15 to ground signal DEFEAT which is employed to disable network interface 37 and, thus, disable communications with the host computer network station 38. Preferably, the cable 3 also includes two conductors 68 and 70 for providing power (e.g., power +40 V and ground GND, respectively) from the master unit 4 to the apprentice unit 5, with a circuit 71, such as a diode and resistor or fuse, being employed to limit current flow from master to apprentice. It will be appreciated that this feature is very useful in terms of downloading settings from a powered master circuit breaker to either an unpowered apprentice circuit breaker or an unpowered apprentice trip unit which is separated from its circuit breaker.

Referring to FIG. 4, under normal operation, when the cable 3 is not connected to the master unit 4, the DEFEAT signal is not grounded, and communications to the INCOM network interface 37 are provided by transmit serial signal TXB from the digital transmitter output TX of the INCOM communication controller (not shown) of microprocessor 30 through INCOM transceiver 72. Similarly, communications from the INCOM network inter-face 37 are provided by receive serial signal RECB and ground ANEGB from INCOM transceiver 72 as filtered by filter 74. In turn, the filter output is presented to the non-inverting (positive) APOS and inverting (negative) ANEG analog inputs of a comparator of the microprocessor 30. The analog output AOUT of the comparator is, then, presented to the digital receiver input RX of the microprocessor's INCOM communication controller through resistors 76,78.

On the other hand, when the signal DEFEAT is grounded to disable the network interface 37, the digital transmitter output TX of the microprocessor's INCOM communication controller (not shown) is communicated to the transmit serial signal TXB1 by a resistor 80 of the INCOM transceiver 72. Also, the receive serial signal RXB1 is communicated to the digital receiver input RX of the INCOM communication controller through resistors 80,78. Preferably, the interface to the transceiver 36 is protected by varistors such as the exemplary MOVs 82,84 for the receive serial signal RXB1 and transmit serial signal TXB1, respectively.

Figure 5:
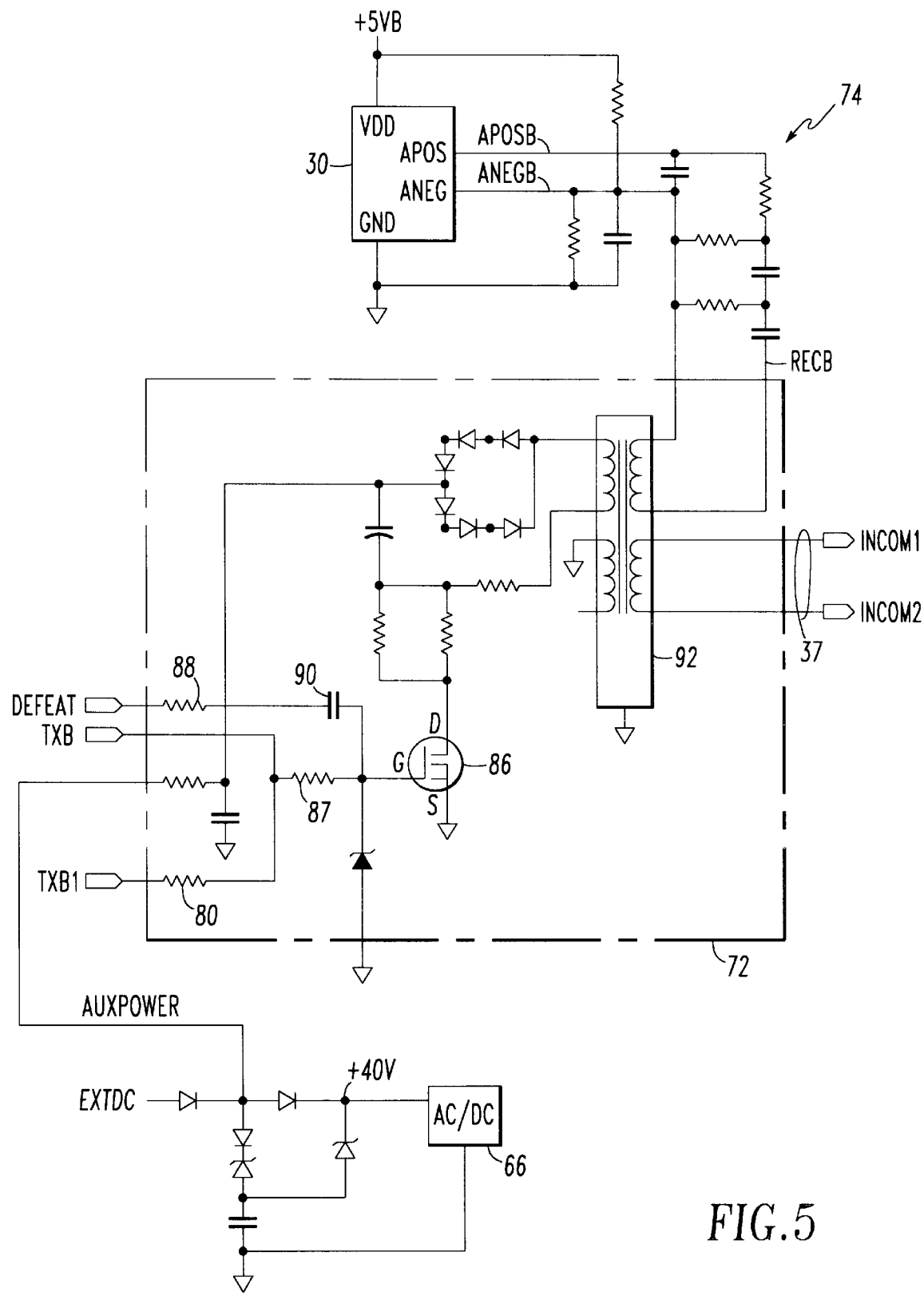
FIG. 5 is a more detailed schematic diagram showing a portion of the communication interface of FIG. 4.

Referring to FIG. 5, a more detailed schematic diagram illustrates the INCOM transceiver 72 and filter 74 of FIG. 4. When the signal DEFEAT is grounded to disable the network interface 37, the transmit serial signal TXB from the digital transmitter output TX of the INCOM communication controller (not shown) of mnicroprocesor 30 is communicated to the transmit serial signal TXB1 by the resistor 80, and, also, is communicated to the gate of transistor 86 by a resistor 87. In this case, the signal at this gate is suitably attenuated by the series combination of resistor 88 and capacitor 90, which is tied to ground GND by the jumper 15 of FIG. 1. An external DC power supply (not shown) supplies a suitable DC voltage at EXTDC.

It will be appreciated that although the exemplary communication interface between the circuit breakers 11,13 of FIG. 2 employs the transceiver 36 for the INCOM network interface 37, a wide range of other communication channels may be used. In the exemplary embodiment, the transfer communications utilize an INCOM message protocol that is described in U.S. Pat. No. 5,270,898 and, also, in U.S. Pat. No. 5,420,799, which is incorporated by reference herein.

Figure 7:
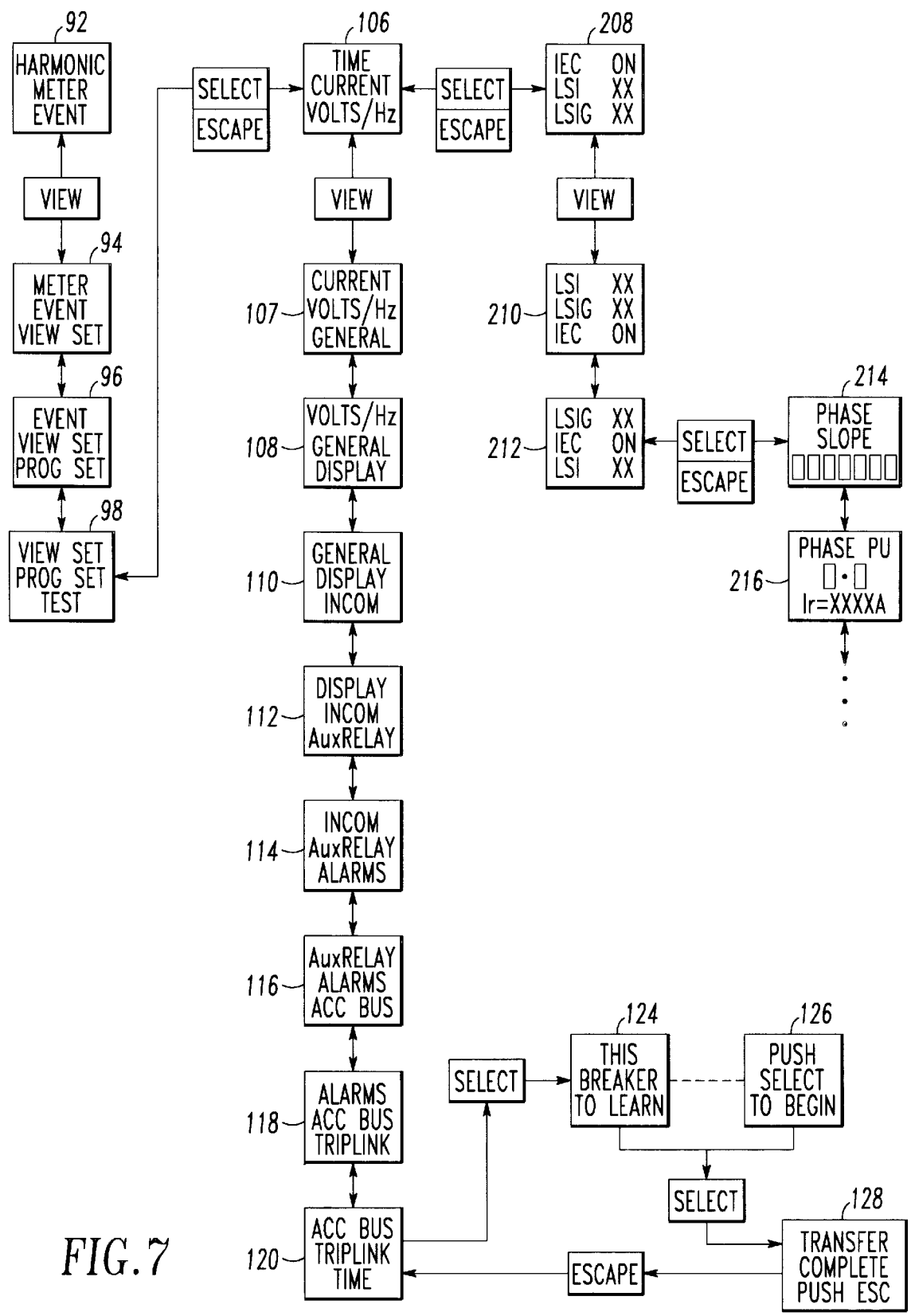
FIG. 7 is sequence of display screens and keypad strokes employed by a user at the apprentice circuit breaker to either download predetermined settings from the master circuit breaker to the apprentice circuit breaker, or to program the settings.

FIG. 7 illustrates a sequence of screens of the apprentice unit's display 34 as accessed by the user through strokes of a keypad 91 of the panel 32 of FIG. 6. The screens 92, 94, 96, and 98 in the first column of FIG. 7 permit the user to, through SELect push button 100, display meter information, display event information (e.g., various trips and alarms), view the settings, and program the settings, respectively. The user navigates between these screens by employing the view up (↑) 102 and view down (↓) 104 push buttons. When at the program settings screen 98, entry to and exit from the screens 106, 107, 108, 110, 112, 114, 116, 118 and 120 in the second column of FIG. 7 is accomplished through the SELect push button 100 and the ESCape push button 122, respectively. These nine screens respectively permit the user to program: (1) current setpoint values for the current protection routine of microprocessor 28; (2) voltage setpoint values and frequency setpoint values for the respective voltage and frequency protection routines of microprocessor 30; (3) other general trip configuration settings; (4) various configuration settings for the meter display; (5) the device address and baud rate for the INCOM network interface 37; (6) various configuration settings for the auxiliary relays 52; (7) alarm values for the various protection routines including, for example, high load alarm, long alarm (e.g., on, off), neutral ampere alarm, ground alarm, external communication alarm, external trip alarm, operate counter alarm (e.g., for the total number of trip operations), and amperes unbalance alarm; (8) various configuration settings for the accessory bus 48 (including, e.g., Table I, external accessory bus trip); and (9) all predetermined settings by transfer or download from the master circuit breaker 11 to the apprentice circuit breaker 13.

At screen 120 ("TRIPLINK"), by pressing the SELect push button 100, the screens 124 ("THIS BREAKER TO LEARN") and 126 ("PUSH SELECT TO BEGIN") are alternately displayed for the user on display 34. At either of the screens 124,126, by pressing the SELect push button 100, the transfer function which transfers or downloads all of the predetermined settings from the master circuit breaker 11 to the apprentice circuit breaker 13 is initiated. When the transfer function is completed, and after the settings have been stored in the EEPROM memories (M) of the microprocessors 28,30, screen 128 is displayed and the user presses the ESCape push button 122 one time to return to screen 120, and a second time to return to screen 98.

Figure 8:
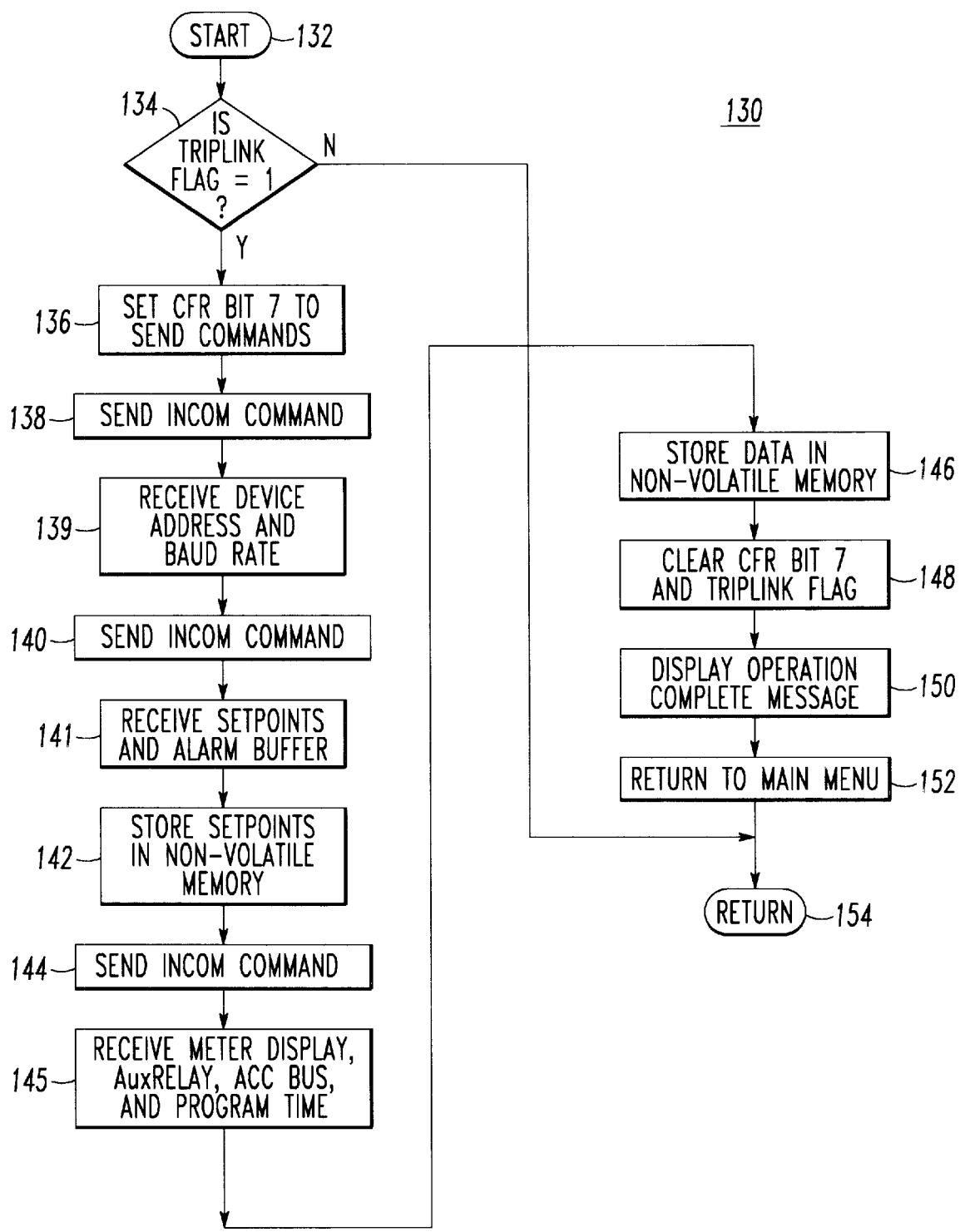
FIG. 8 is a flowchart of a firmware routine executed by the display microprocessor of the apprentice circuit breaker to download the predetermined settings from the master circuit breaker.

FIG. 8 is a flowchart of a firmware routine 130 executed by the display microprocessor 30 of the apprentice circuit breaker 13 of FIG. 2 to download the predetermined settings from the master circuit breaker 11. The routine 130 is started at 132 by a display routine (166 of FIG. 9) which detects the active state of the SELect push button 100 at screen 124 or 126 of FIG. 7 and either sets or clears a "TripLink" flag based on the state of a transfer function permissive flag stored in the EEPROM memory (M) of the microprocessor 30. At 134, the state of the "TripLink" flag is checked. If this flag is zero, then the routine 130 returns at 154. Otherwise, if the "TripLink" flag is set to one, then the transfer function is commenced.

First, in the transfer function, bit 7 ("Communication Subsystem Master Enable") of the configuration register CFR of the microprocessor 30 is set to permit the INCOM communication controller to be switched into a master (not to be confused with the master circuit breaker 11) mode and, thus, be enabled to send commands to the master (not to be confused with the INCOM communication controller master mode) circuit breaker 11 to request its predetermined settings. Next, at 138, the microprocessor 30 instructs its INCOM communication controller to send an INCOM command to the master circuit breaker 11 to request its device address and baud rate for the INCOM network interface 37 and, at 139, after those settings are received at the INCOM communication controller, they are read by the microprocessor 30. In the event that no response is received, then steps 138 and 139 are repeated for all possible baud rates (e.g., 1200 baud, 9600 baud).

At 140, the microprocessor 30 instructs its INCOM communication controller to send an INCOM command to the master circuit breaker 11 to request its current, voltage, frequency and alarm setpoint values and other settings and, at 141, after those settings are received at the INCOM communication controller, they are read by the microprocessor 30. Then, at 142, the settings received at 141 are stored in the appropriate EEPROM memories (M) of the microprocessors 28,30.

An exemplary list of the current related setpoints includes: external ground CT ratio; phase loss duration time; amperes unbalance duration time; amperes unbalance trip point; operations alarm setpoint; neutral alarm pickup; ground alarm pickup; power factor waveform capture setpoint; and ground alarm time.

An exemplary list of the voltage related setpoints includes: under voltage alarm setpoint; over voltage alarm setpoint; under voltage trip setpoint; and over voltage trip setpoint. An exemplary list of the frequency related setpoints includes: under frequency alarm setpoint; over frequency alarm setpoint; under frequency trip setpoint; over frequency trip setpoint; under frequency trip time; and over frequency trip time.

An exemplary list of some of the other settings includes: frame rating; long delay time setting, slope (e.g., $I^2t, I^4t$), and action (e.g., off, trip, none); short delay pickup setting, time, slope (e.g., flat, $I^2t$), action (e.g., off, trip), and limit; instantaneous pickup, action (e.g., off, trip), and limit; ground delay pickup, action (e.g., off, trip, alarm, none), time, slope (e.g., flat, $I^2t$), and limit; discriminator action (e.g., off, trip); 4th pole protection (e.g., off, trip); frequency (e.g., 60 Hz, 50 Hz); powered thermal memory (e.g., on, off); high load alarm pickup; neutral ratio; auto-waveform capture time interval (e.g., 1 minute, 5 minute, 10 minute, off); and phase time dial limit and ground time dial limit (for IEC trip curve).

Next, at 144, the microprocessor 30 instructs its INCOM communication controller to send one or more INCOM commands to the master circuit breaker 11 to request its configuration settings for the meter display (e.g., each of the display screens, such as, for example, phase currents, neutral and ground currents, line-to-line voltages, power, kVA, kVAr, average kW, and demand maximum kW, may advantageously be enabled or disabled in order that the user may select whether the view up and view down push buttons 102,104 select those screens for display), the auxiliary relays 52 (e.g., the user may configure whether groupings of, for example, 10, 15, or 18 display screens may be viewed through the view up and view down push buttons 102,104), the accessory bus 48 (e.g., up to four devices or modules with up to four relays per module such as, for example, auxiliary, bell, deadman, or off), and the date and time (e.g., day, month, year, hours, minutes, seconds), and, at 145, after those settings are received at the INCOM communication controller, they are read by the microprocessor 30. Then, at 146, the settings received at 145 are stored in the appropriate EEPROM memories (M) of the microprocessors 28,30.

At 148, bit 7 of the configuration register CFR of the microprocessor 30 is cleared to disable the INCOM communication controller from sending commands to the master circuit breaker 11, and the "TripLink" flag is cleared. At 150, the screen 128 of FIG. 7 is displayed to indicate completion of the transfer function. Then, at 152, when the user presses the ESCape push button 122, the screen 120 of FIG. 7 is displayed. Finally, the routine 130 returns at 154.

The routine 130 employs the INCOM messages to communicate with the master trip unit 10 of the master circuit breaker 11 by employing the communication channel 3 to acquire the predetermined settings of the master trip unit 10. In turn, steps 142 and 146 of the routine 130 permit the microprocessors 28,30 to employ the predetermined settings, as acquired from the master circuit breaker 11, as the new predetermined values of the apprentice circuit breaker 13.

In summary, the transfer function is initiated as follows. First, the user connects the apprentice end of the communication cable 3 to the trip unit of the apprentice circuit breaker 13 to be programmed (i.e., the apprentice unit). Then, the user connects the master end of the communication cable 3 to the trip unit 10 containing the predetermined settings to be downloaded (i.e., the master unit). No other user manipulation of the master unit is required. Next, from the exemplary keypad 91 of the apprentice unit (accessible at the front of the trip unit), the user selects the transfer function by accessing the display screens 124,126 of FIG. 7.

After the transfer function is selected, the apprentice unit prompts the user to "learn" the settings of the master unit by pressing the ESCape push button 102 when the transfer of those settings is completed. Finally, the user removes the communication cable 3 from both of the units.

Figure 9:
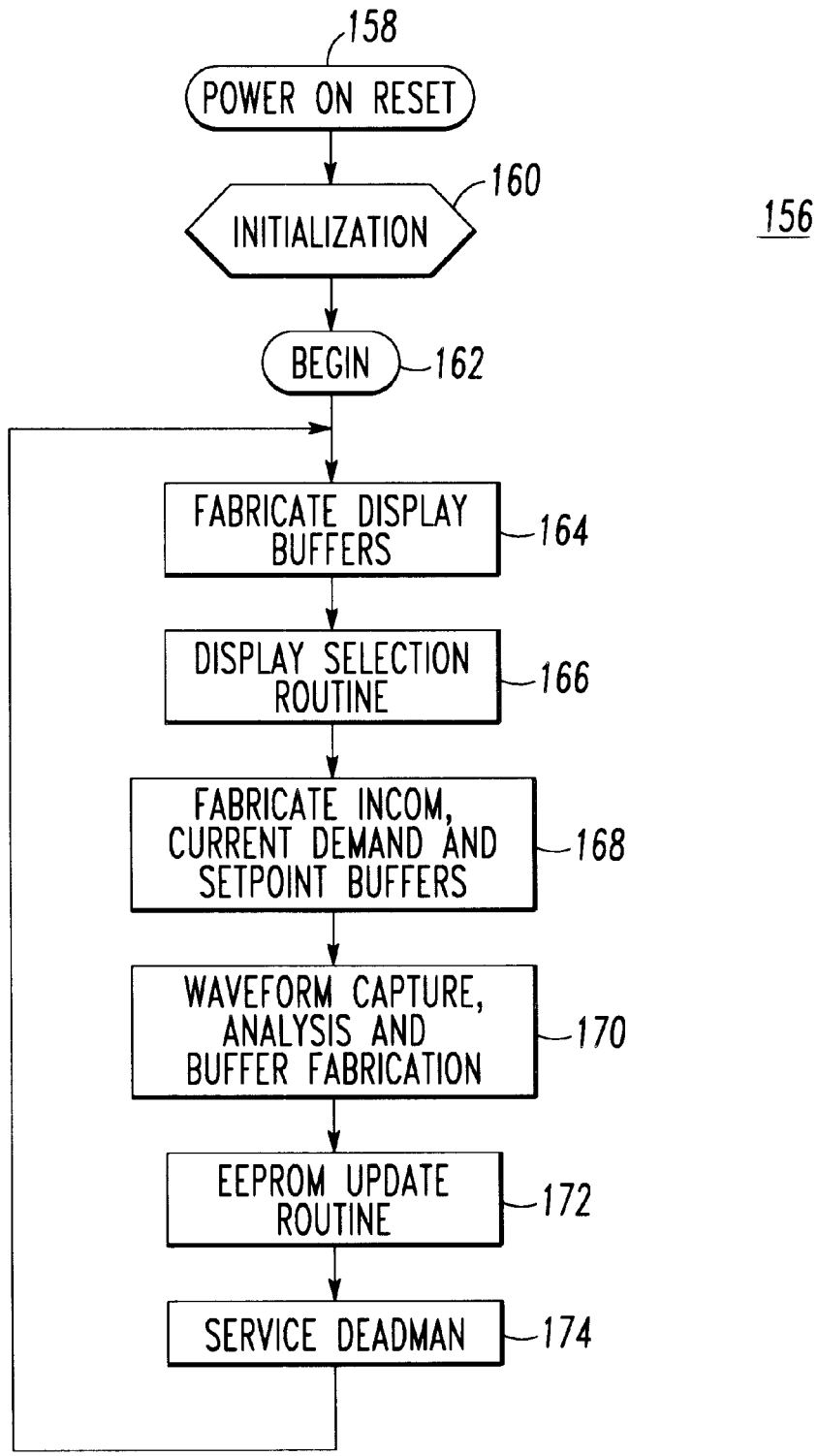
FIG. 9 is a flowchart of the main firmware routine executed by the display microprocessor of FIG. 2.

Referring to FIG. 9, a main firmware routine 156 executed by the display microprocessor 30 of FIG. 2 is illustrated. After power on reset at 158, initialization is conducted at 160 including moving certain predetermined settings from EEPROM to RAM (not shown) of the microprocessor 30 (e.g., in order to employ the predetermined settings from the master unit as this unit's settings for protection and other functions). The main loop begins at 162 after which display buffers for the display 34 are fabricated at 164 (e.g., to display the trip unit's operation settings) and, if requested, the next display screen is selected at 166. At 168, various buffers for INCOM, current demand and setpoints are fabricated for later access by the central controller 38. Then, at 170, waveform capture, analysis and buffer fabrication is conducted. Next, at 172, the microprocessor's EEPROM is updated based on any newly received settings (e.g., from the panel 32 or a PC as discussed above in connection with FIG. 3). After a deadman timer is serviced at 174, the main loop is repeated at 164.

Figure 10:
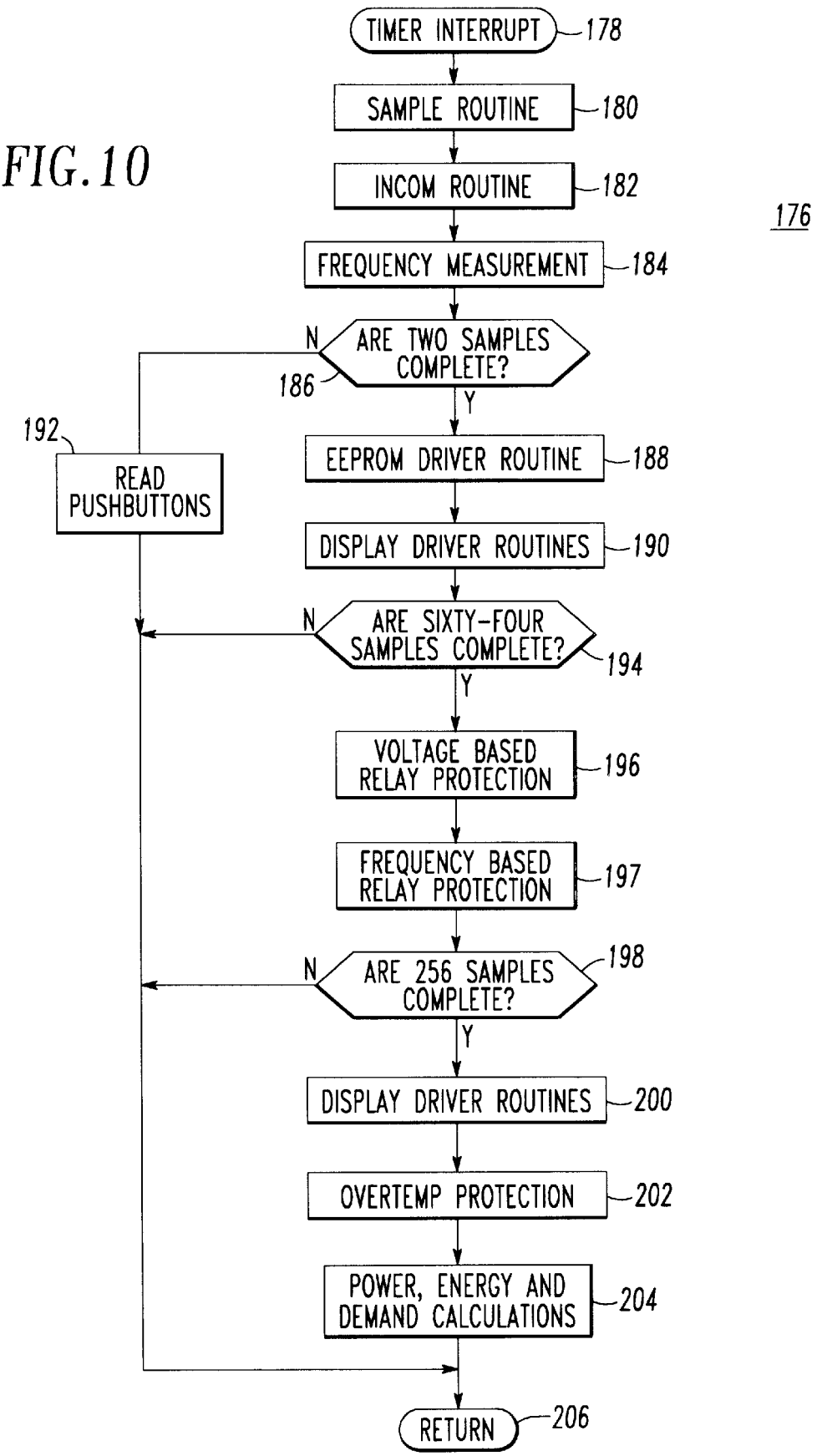
FIG. 10 is a flowchart of a timer interrupt firmware routine executed by the display microprocessor of FIG. 2.

FIG. 10 is a flowchart of a timer interrupt firmware routine 176 executed by the display microprocessor 30 of FIG. 2. The routine 176 starts at 178 in response to a timer interrupt. At 180, various currents and voltages are sampled from the A/D 24. Then, at 182, an INCOM routine is executed which services the INCOM communication transceiver 36. It is this routine which responds to INCOM messages sent by an apprentice circuit breaker, such as 13, to a master circuit breaker, such as 11, over the communication channel 3 to transfer the predetermined settings of the master unit. After various frequencies are measured at 184, it is determined whether two sets of current, voltage, and frequency samples are completed at 186. If so, then time critical control of the microprocessor's EEPROM is conducted, as needed, at 188, and the display 34 is updated at 190. On the other hand, if two sets of current, voltage, and frequency samples are not complete at 186, then the push buttons of the keypad 91 are read at 192.

At 194, it is determined whether 64 sets of current, voltage, and frequency samples are completed. If so, then voltage based relay protection is conducted at 196 and frequency based relay protection is conducted at 197. At 198, it is determined whether 256 sets of current, voltage, and frequency samples are completed. If so, then the display 34 is updated at 200 and over-temperature protection is conducted at 202. Then, at 204, various power, energy and demand calculations are updated before the routine 176 returns at 206. Similarly, the routine 176 also returns after 192, and after 194 and 198 if 64 and 256, respectively, sets of samples are not complete.

It will be appreciated that step 196, for example, provides the trip signal 49 to the operating mechanism 42 as a function of the sensed voltage conditions and the corresponding voltage related predetermined values. Although not shown, the other microprocessor 28 includes a timer interrupt firmware routine which provides the other trip signal 40 to the operating mechanism 42 as a function of the sensed current conditions and the corresponding current related predetermined values.

Referring again to FIG. 7, from screen 106, through the SELect push button 100, the user may view screens 208, 210,212 which pertain to configuration of one of three types of exemplary trip curves (e.g., IEC, LSI and LSIG). The user navigates between these screens by using the view up (↑) 102 and view down (↓) 104 push buttons (e.g., pressing view down (↓) 104 twice to display screen 212). In turn, from screen 212, through the SELect push button 100, the user may view screens such as 214,216 which pertain to configuration of settings for the IEC trip curve. From those screens, after configuring the IEC trip curve, the user returns to screen 212 by pressing the ESCape push button 122. At that time, the screens 208,210,212 are updated to display "ON" after "IEC" to indicate that the IEC trip curve, but not the LSI or LSIG trip curves, has been configured. In turn, the display selection routine 166 of FIG. 9 stores this "ON" setting for the "IEC" trip curve, as well as other display configuration settings (e.g., the groupings of display screens for the auxiliary relays 52) and trip unit operation settings for selectively displaying the trip unit operation settings.

The exemplary circuit breakers 1,2,11,13 permit the user to easily and quickly download previously programmed settings from a master unit to an apprentice unit. The exemplary transfer function provides the user with a fast, safe, accurate, and simple method of transferring predetermined settings directly from one trip unit to another trip unit without the need for substantial user involvement, and without the need for a computer or other intermediary device.

In this manner, the user may easily interchange trip units (or circuit breakers including trip units) for maintenance or testing by readily transferring the predetermined settings to the replacement unit. Furthermore, the time required to individually program multiple trip units is reduced. For example, once one trip unit has been programmed, it may be employed as a master unit by using its predetermined settings as a template to be downloaded to other closely related, non-programmed apprentice units, with the user being responsible for minimal changes to the newly programmed, former apprentice units (e.g., modifying the device address to provide the appropriate unique device address for each of the newly configured trip units).

While specific embodiments of the invention have been described in detail, it will be appreciated by those skilled in the art, that various modifications and alternatives to those details could be developed in light of the overall teachings of the disclosure. Accordingly, the particular arrangements disclosed are meant to be illustrative only, and not limiting as to the scope of invention which is to be given the full breadth of the claims appended and any and all equivalence thereof.

What is claimed is:

1. A pair of substantially similar electrical switching devices comprising:

a first electrical switching device having at least one predetermined setting;

a second electrical switching device; and a communication channel interconnecting said first and second electrical switching devices, with each of said first and second electrical switching devices comprising:

separable contacts, operating means emnloving a trip signal to open said separable contacts, means for sensing at least one electrical condition operatively associated with said separable contacts, and a trip unit comprising:

memory means for storing at least one predetermined value, means for providinp the trip signal to said operating means as a function of said at least one sensed electrical condition and said stored at least one predetermined value, and means for communicating with another electrical switching device by employing said communication channel, and with the trip unit of said second electrical switching device further comprising:

means cooperating with said means for communicating with another electrical switching device for transferring said at least one predetermined setting from said first electrical switching device, means for receiving said transferred at least one predetermined setting from said means for communicating with another electrical switching device, and means for storing said received transferred at least one predetermined setting in said memory means as said at least one predetermined value, wherein said at least one predetermined setting is a plurality of predetermined settings; wherein said at least one predetermined value is a plurality of predetermined values; wherein the memory means of the trip unit of said first electrical switching device stores a plurality of first operating values as the predetermined values of the last said memory means; wherein the memory means of the trip unit of said second electrical switching device stores a plurality of second operating values as the predetermined values of the last said memory means; wherein said means for communicating with another electrical switching device of the trip unit of said second electrical switching device includes means for requesting said first operating values from said first electrical switching device; and wherein said means for communicating with another electrical switching device of the trip unit of said first electrical switching device includes means for responding to said second electrical switching device with said first operating values.

2. A pair of substantially similar electrical switching devices comprising:

a first electrical switching device having at least one predetermined setting;

a second electrical switching device; and a communication channel interconnecting said first and second electrical switching devices, with each of said first and second electrical switching devices comprising:

separable contacts, operating means employing a trip signal to open said separable contacts, means for sensing at least one electrical condition operatively associated with said separable contacts, and a trip unit comprising:

memory means for storing at least one predetermined value, means for providing the trip signal to said operating means as a function of said at least one sensed electrical condition and said stored at least one predetermined value, and means for communicating with another electrical switching device by employing said communication channel, and with the trip unit of said second electrical switching device further comprising:

means cooperating with said means for communicating with another electrical switching device for transferring said at least one predetermined setting from said first electrical switching device, means for receiving said transferred at least one predetermined setting from said means for communicating with another electrical switching device, and means for storing said received transferred at least one predetermined setting in said memory means as said at least one predetermined value;

wherein said first electrical switching device includes means for providing power to said second electrical switching device, in order to transfer said at least one predetermined setting from said first electrical switching device to said second electrical switching device.

* * * * *